(12) United States Patent
Porras Luraschi et al.

(10) Patent No.: US 10,108,737 B2
(45) Date of Patent: Oct. 23, 2018

(54) PRESENTING DATA DRIVEN FORMS

(75) Inventors: Javier Arturo Porras Luraschi, Redmond, WA (US); Alisa Yujin So, Mill Creek, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1004 days.

(21) Appl. No.: 13/357,622

(22) Filed: Jan. 25, 2012

(65) Prior Publication Data

US 2013/0191713 A1 Jul. 25, 2013

(51) Int. Cl.
*G06F 3/048* (2013.01)
*G06F 17/30* (2006.01)
*G06F 3/0482* (2013.01)

(52) U.S. Cl.
CPC ........ *G06F 17/30902* (2013.01); *G06F 3/048* (2013.01); *G06F 3/0482* (2013.01)

(58) Field of Classification Search
CPC .... G06F 17/243; G06F 3/0483; G06F 3/0488; G06F 17/30902; G06F 3/048
See application file for complete search history.

(56) References Cited

U.S. PATENT DOCUMENTS 6,281,986 B1 * 8/2001 Form ................ G06F 17/30274
345/522
6,496,206 B1 12/2002 Mernyk et al.
7,940,250 B2 5/2011 Forstall
8,271,898 B1 * 9/2012 Mattos ................. G06F 3/0485
345/473
8,280,414 B1 * 10/2012 Nourse .................. G01S 19/14
455/456.1
8,438,504 B2 * 5/2013 Cranfill ................ G06F 3/0481
715/863

(Continued)

FOREIGN PATENT DOCUMENTS

CN 102314298 1/2012
EP 2224351 9/2010

(Continued)

OTHER PUBLICATIONS

"International Search Report", dated May 30, 2013, Application No. PCT/US2013/022433, Filed date: Jan. 22, 2013, pp. 10.

(Continued)

*Primary Examiner* — Scott Baderman
*Assistant Examiner* — Benjamin J Smith
(74) *Attorney, Agent, or Firm* — Schwegman Lundberg & Woessner, P.A.

(57) ABSTRACT

Concepts and technologies are described herein for presenting data driven forms. In accordance with the concepts and technologies disclosed herein, a user device obtains a resource referencing or presenting data driven forms and obtains data displayed or used by the resource. The user device stores the data in a cache accessible by the user device. The user device can render multiple views containing data from the cache. The user device can display one of the views and hide the other views from display. If the user device detects input for viewing other views, the user device can present one of the previously hidden views. The user device also can manage the cache and download additional data, if the cache empties or is not full.

18 Claims, 9 Drawing Sheets

(56) References Cited

U.S. PATENT DOCUMENTS

| | | | | |
|---|---|---|---|---|
| 8,564,544 | B2* | 10/2013 | Jobs | G06F 3/0488 345/173 |
| 8,595,186 | B1* | 11/2013 | Mandyam | G06F 8/38 707/632 |
| 8,736,557 | B2* | 5/2014 | Chaudhri | G06F 3/04815 345/173 |
| 2001/0050658 | A1 | 12/2001 | Adams | |
| 2002/0049977 | A1* | 4/2002 | Miller | H04N 7/17336 725/82 |
| 2003/0187984 | A1* | 10/2003 | Banavar | H04L 29/06 709/225 |
| 2004/0199664 | A1* | 10/2004 | Feldman | H04L 45/02 709/238 |
| 2004/0233239 | A1* | 11/2004 | Lahdesmaki | G06F 3/0482 715/810 |
| 2006/0184537 | A1 | 8/2006 | Sauve et al. | |
| 2007/0022102 | A1* | 1/2007 | Saxena | G06F 17/30902 |
| 2007/0074120 | A1* | 3/2007 | Lindhorst | G06F 17/30867 715/744 |
| 2007/0150820 | A1* | 6/2007 | Salvo | G06F 8/38 715/760 |
| 2007/0186186 | A1* | 8/2007 | Both | G06F 3/04817 715/821 |
| 2008/0062141 | A1* | 3/2008 | Chandhri | G06F 3/0482 345/173 |
| 2008/0065675 | A1* | 3/2008 | Bozich | G06F 17/30011 |
| 2008/0094370 | A1* | 4/2008 | Ording | G06F 3/04883 345/173 |
| 2008/0122796 | A1* | 5/2008 | Jobs | G06F 3/0488 345/173 |
| 2008/0201331 | A1* | 8/2008 | Eriksen | G06F 17/30902 |
| 2008/0259057 | A1 | 10/2008 | Brons | |
| 2008/0288449 | A1* | 11/2008 | Kim | G06F 17/30905 |
| 2009/0002335 | A1* | 1/2009 | Chaudhri | G06F 3/04815 345/173 |
| 2009/0112975 | A1* | 4/2009 | Beckman | H04L 67/26 709/203 |
| 2009/0210441 | A1* | 8/2009 | Mercer | G06F 17/30905 |
| 2010/0082670 | A1 | 4/2010 | Chan et al. | |
| 2010/0083165 | A1* | 4/2010 | Andrews | G06F 1/1626 715/784 |
| 2010/0114991 | A1* | 5/2010 | Chaudhary | G06F 17/3002 707/809 |
| 2010/0162126 | A1* | 6/2010 | Donaldson | G06F 17/30902 715/738 |
| 2010/0214237 | A1* | 8/2010 | Echeverri | G06F 3/04883 345/173 |
| 2010/0229086 | A1* | 9/2010 | Howell | G06F 17/2205 715/273 |
| 2010/0262780 | A1* | 10/2010 | Mahan | G06F 17/30902 711/118 |
| 2010/0293330 | A1* | 11/2010 | Maloney | G06Q 10/10 711/118 |
| 2011/0078560 | A1* | 3/2011 | Weeldreyer | G06F 17/214 715/255 |
| 2011/0148932 | A1* | 6/2011 | Niemi | G06F 17/30274 345/660 |
| 2011/0163972 | A1* | 7/2011 | Anzures | G06F 3/04883 345/173 |
| 2011/0167341 | A1* | 7/2011 | Cranfill | G06F 3/0481 715/702 |
| 2011/0191407 | A1* | 8/2011 | Fu | G06F 8/38 709/203 |
| 2011/0231481 | A1 | 9/2011 | Calahan | |
| 2012/0078877 | A1* | 3/2012 | Copperman | G06F 8/34 707/711 |
| 2012/0084638 | A1* | 4/2012 | Calvin | G06F 17/24 715/234 |
| 2012/0210214 | A1* | 8/2012 | Yoo | G06F 3/0482 715/702 |
| 2012/0266068 | A1* | 10/2012 | Ryman | G06F 3/0485 715/719 |
| 2012/0278704 | A1* | 11/2012 | Ying | G06F 17/2247 715/243 |
| 2012/0290940 | A1* | 11/2012 | Quine | G06F 8/34 715/744 |
| 2012/0311477 | A1* | 12/2012 | Mattos | G06F 3/0485 715/777 |
| 2013/0024757 | A1* | 1/2013 | Doll | G06F 17/212 715/204 |
| 2013/0061159 | A1* | 3/2013 | Tseng | G06F 17/30873 715/760 |
| 2013/0061160 | A1* | 3/2013 | Tseng | G06F 17/30905 715/760 |
| 2013/0067390 | A1* | 3/2013 | Kwiatkowski | G06F 9/451 715/784 |
| 2013/0067399 | A1* | 3/2013 | Elliott | G06F 3/0482 715/800 |
| 2013/0067420 | A1* | 3/2013 | Pittappilly | G06F 3/0236 715/863 |
| 2013/0086264 | A1* | 4/2013 | Kini | H04L 47/803 709/225 |
| 2013/0086532 | A1* | 4/2013 | Shakespeare | G06F 3/0416 715/863 |
| 2013/0100059 | A1* | 4/2013 | Champion | G06F 3/0488 345/173 |
| 2013/0111395 | A1* | 5/2013 | Ying | G06F 3/0483 715/783 |

FOREIGN PATENT DOCUMENTS

| | | |
|---|---|---|
| JP | 2006-270755 A | 10/2006 |
| KR | 10-0871228 B1 | 12/2008 |
| KR | 10-0996602 B1 | 11/2010 |
| KR | 10-2012-0001800 A | 1/2012 |

OTHER PUBLICATIONS

"Safari Features", Retrieved at <<http://www.apple.com/safari/features.html>>, Retrieved Date: Nov. 21, 2011, pp. 16.

Raymond Camden, "Another experiment in jQuery Mobile swipe navigation", Mar. 26, 2011, Retrieved at <<http://www.coldfusionjedi.com/index.cfm/2011/3/26/Another-experiment-in-jQuery-Mobile-swipe-navigation>>, Retrieved Date: Nov. 21, 2011, pp. 8.

"Why are iOS touch and swipe interfaces so much more responsive than Android?", Retrieved at <<http://www.quora.com/Why-are-iOS-touch-and-swipe-interfaces-so-much-more-responsive-than-Android>>, Retrieved Date: Nov. 21, 2011, pp. 2.

Office action for CN Patent Application No. 201380006832.8, dated Feb. 24, 2016, Qianbai et al., "Electronic Device and Method for Displaying Toolbar," 12 pages.

Eikenes, et al., "Navimation: Exploring Time, Space & Motion in the Design of Screen-Based Interfaces", In International Journal of Design, vol. 4, Issued 1, Apr. 2010, 17 Pages.

"Search Report Issued in European Patent Application No. 13741124.5", dated Mar. 17, 2016, 9 Pages.

"Office Action Issued in European Patent Application No. 13741124.5", dated Jun. 27, 2018, 7 Pages.

Neuberg, Brad, "Creating Offline Web Applications With Dojo Offline", Retrieved From: https://web.archive.org/web/20100618202014/http://docs.google.com/View?docid=dhkhksk4_8gdp9gr, Sep. 23, 2007, 19 Pages.

* cited by examiner

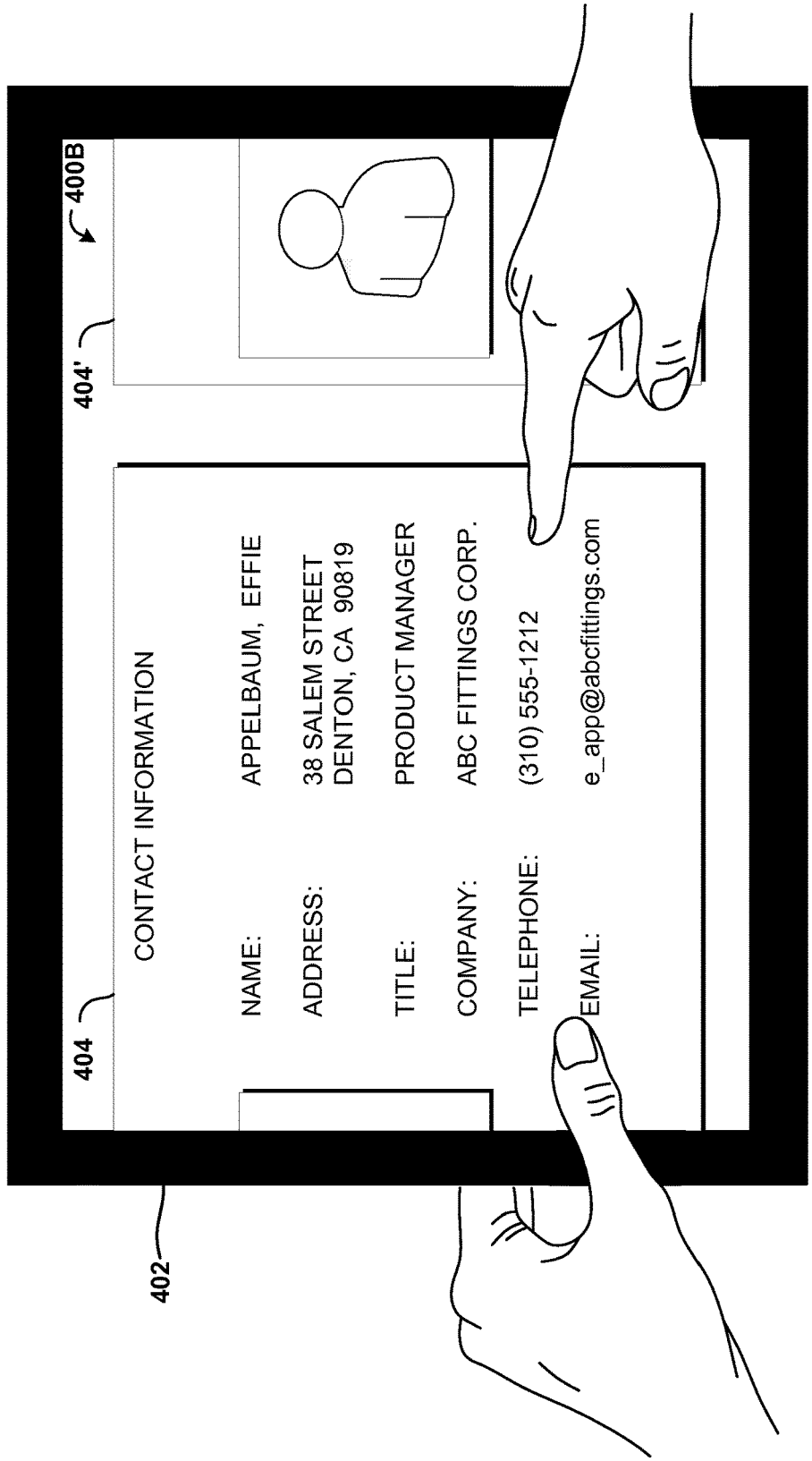

PRESENTING DATA DRIVEN FORMS

BACKGROUND

Some applications and web sites include functionality for displaying or presenting in data driven forms, windows, or views ("data driven forms"). Presenting data in data driven forms can be useful, for example, when the data is subject to change. Data for the data driven forms can be obtained from a database or other data storage device that can be updated regularly and loaded into the data driven forms for presentation to a user.

When authoring web sites relying upon or including functionality for data driven forms, authors may write code targeting particular devices or classes of devices. With the proliferation of mobile computing devices and the access of ever-diversifying types of data using these mobile computing devices, the importance of accommodating a wide variety of devices has become a concern for authors of web sites and data driven forms. Similarly, mobile computing devices sometimes pose challenges for web site authors that may or may not be considered when preparing web sites or applications for use or viewing on desktop or laptop computing systems. For example, desktop and/or laptop computing systems may have access to a dedicated always-on network connection, thereby essentially guaranteeing a reliable network connection. Some mobile computing systems, on the other hand, may rely on network connections with high latency, unreliable connectivity, and/or bandwidth and/or communication speeds that are slow compared to their desktop or laptop counterparts.

Because of these and other challenges, authors sometimes release stand-alone applications for interacting with data that otherwise may be suitable for presentation in a data driven form or view. These applications may execute natively on the mobile device and therefore can be optimized for a particular device to provide a compelling user experience. These applications, however, may require the device to download all of the relied-upon data to function. Furthermore, some authors may be interested in providing a consistent user experience to users of the web sites or other resources on other platforms. Matching stand-alone application appearance and/or functionality to appearance and/or functionality provided by data driven forms may be difficult.

It is with respect to these and other considerations that the disclosure made herein is presented.

SUMMARY

Concepts and technologies are described herein for presenting data driven forms. In accordance with the concepts and technologies disclosed herein, data driven forms are displayed by a computing system such as a user device. In some embodiments, the data driven forms are displayed without installing or executing native applications and/or without requiring network communications for each requested data driven form. In particular, the user device can obtain a resource such as an application or web page that references or presents one or more data driven forms and obtain data displayed or used by the resource. The data can be stored by the user device in a cache accessible by the user device.

In accordance with various embodiments, multiple views are rendered by the user device. Each of the views can contain data from the cache. A "view" as used herein can include a user interface or screen display for presenting a data driven form such as a web site, an application screen, a window, a form, or the like. According to some embodiments, the user device can render one data driven form and display one view including the data driven form as a current view. The user device also can render one or more other data driven forms, generate views including the data driven forms, and hide the other views from display. The user device can monitor activity at the user device and can detect input corresponding to a request or command to view another data driven form or view thereof.

If the user device detects input corresponding to a request or command to view another data driven form or view, the user device can modify the display. For example, the user device can hide the currently viewed data driven form and present one of the previously hidden views of the data driven forms as a current visible view. In some embodiments, the user device determines if the cache is full or stores enough data to render additional data driven forms. If the cache is full, the user device can wait for further input or take other actions. If the cache is not full, the user device can obtain additional data and store the data in the cache. According to various embodiments, the communications to obtain additional data can be conducted asynchronously. For example, the user device can download the data at a time at which the data is not needed and instead can be stored to the cache. Thus, some embodiments of the concepts and technologies disclosed herein provide low-latency display of multiple data driven forms without executing a native application and/or without completing communications to obtain data for the data driven forms.

According to one aspect, a user device communicates with a web server via a network. The web server can host a resource and data. The resource can include or can correspond to data driven forms and the data can include data displayed within the data driven forms. The user device can obtain the resource and the data and can store the data in a cache at, or associated with, the user device. One or more application programs executing at the user device can generate one or more user interfaces for displaying the data. According to various embodiments, the user interfaces can correspond to, or can include, a data driven form for presenting the data.

According to another aspect, the user device is configured to render multiple views. The user device can display one of the rendered views and can hide the other rendered views. In response to detecting input for viewing another of the views, the user device can present one of the hidden views and can hide the previously visible view. The user device also can render another view and can hide the other rendered view until input is received. The user device also can determine if the cache is full after rendering additional views. If the cache is not full, the user device can communicate with the web server to obtain additional data. The additional data can be stored in the cache and can be used to provide additional views.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

BRIEF DESCRIPTION OF THE DRAWINGS

FIGS. 4A-4C are user interface diagrams illustrating an illustrative implementation of the concepts and technologies disclosed herein for presenting data driven forms.

DETAILED DESCRIPTION

Figure 1:
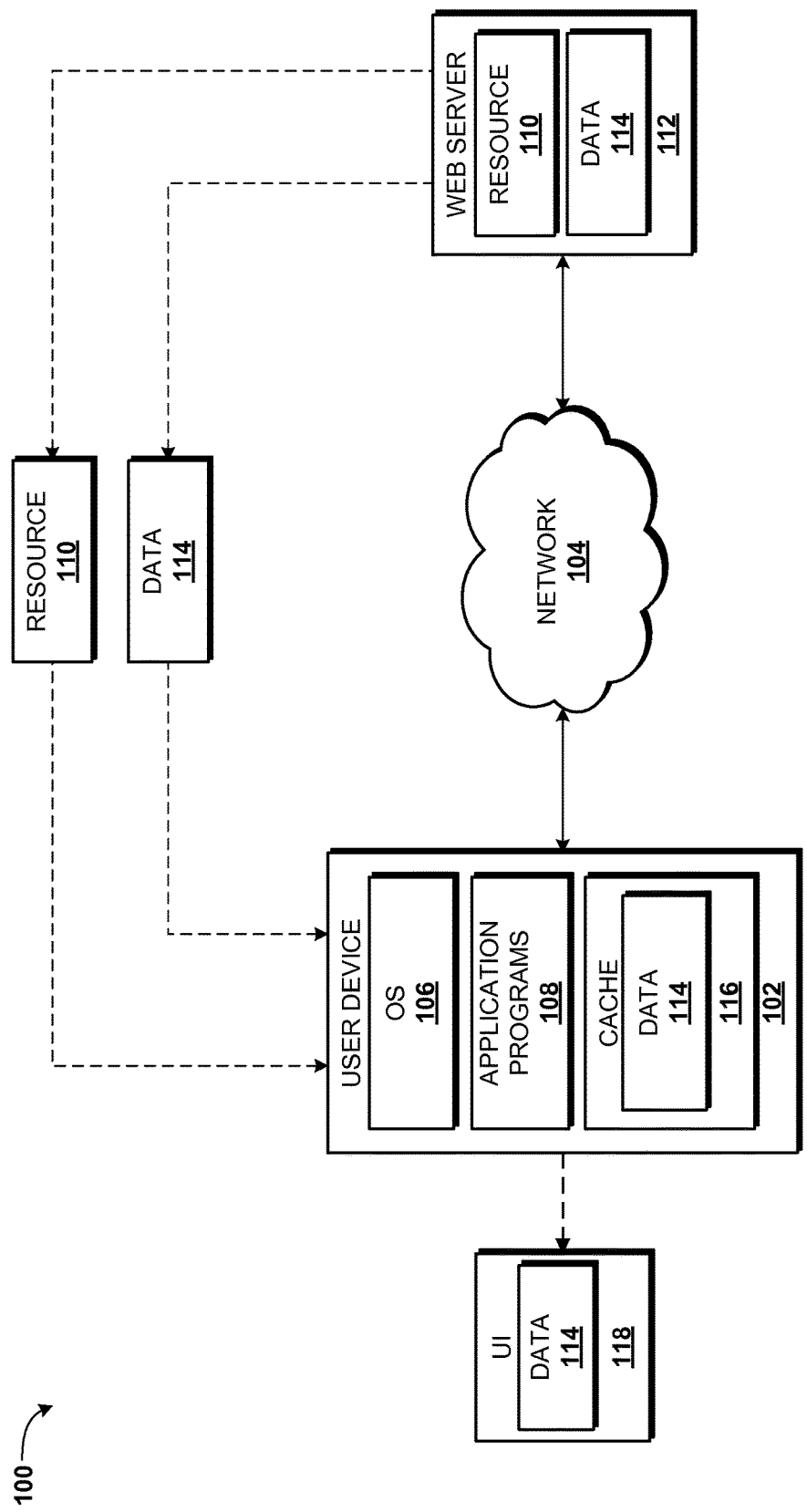
FIG. 1 is a system diagram illustrating an illustrative operating environment for the various embodiments disclosed herein.

The following detailed description is directed to concepts and technologies for presenting data driven forms. According to the concepts and technologies described herein, a computing system such as a user device can obtain a resource referencing or presenting data driven forms and can obtain data displayed or used by the resource. The user device can store the data in a cache accessible by the user device. The user device can render multiple views containing data from the cache. The user device can display one of the multiple views and can hide the other views from display. If the user device detects input for viewing other views, the user device can present one of the previously hidden views and can hide the previously visible view.

In some embodiments, the user device can determine, after modifying the display, if the cache is full or stores enough data to render additional views. If the cache is full or stores sufficient data for additional rendering, the user device can wait for further input or take other actions. If the cache is not full or does not store sufficient data for additional renderings of the views, the user device can obtain additional data and store the data in the cache. According to various embodiments, the communications to obtain additional data can be conducted asynchronously. As such, the data can be downloaded by the user device at a time at which the data is not needed for rendering and can instead be stored at the cache. Thus, some embodiments of the concepts and technologies disclosed herein can be used to provide low-latency display of multiple data driven forms without executing a native application and/or without completing communications to obtain data for the data driven forms.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for presenting data driven forms will be presented.

Referring now to FIG. 1, aspects of one operating environment 100 for the various embodiments presented herein will be described. The operating environment 100 shown in FIG. 1 includes a user device 102 operating on or in communication with a network 104. According to various embodiments, the functionality of the user device 102 is provided by a personal computer ("PC") such as a desktop or laptop computer system; other types of computing systems including, but not limited to, server computers or embedded computer systems; mobile computing devices such as handheld computers, netbook computers, personal digital assistants, mobile telephones, smart phones; and/or other computing systems or devices. For purposes of describing the concepts and technologies disclosed herein, the functionality of the user device 102 is described herein as being provided by a tablet computer or other mobile computing device. It should be understood that this embodiment is illustrative, and should not be construed as being limiting in any way.

The user device 102 is configured to execute an operating system 106 and one or more application programs 108. The operating system 106 is a computer program for controlling the operation of the user device 102. The application programs 108 are executable programs configured to execute on top of the operating system 106 to provide the functionality described herein for presenting data driven forms. According to various embodiments, the application programs 108 include, but are not limited to, web browsers, stand-alone applications, and/or other software, applications, and/or modules for accessing a resource 110. The resource 110 can be hosted by a web server 112 or other device or node operating as part of, or in communication with, the network 104. Because the resource 110 can be obtained from additional and/or alternative entities, it should be understood that this embodiment is illustrative, and should not be construed as being limiting in any way.

According to various embodiments, the resource 110 includes, but is not limited to, a file, application, site, page, or other resource that includes or relies upon data driven forms. As used herein, a data driven form can include a form, page, application, view, or other element that references and/or presents data to a user. For example, a data driven form can include a contact page for a company or person, where the contact information presented by the contact page can be loaded from a contact database or other data storage location and presented within the contact page. As such, if the contact information is changed within the contact database or other data storage location, the contact page can present the new data without being modified separately. Thus, data driven forms can be used to display updated data presented within the pages or applications. Because data driven forms are generally understood, data driven forms and/or views are not described in more detail herein.

The web server 112 can host or access data 114 used by the resource 112, for example within a data driven form or view. While the data 114 is illustrated as being stored at the web server 112, it should be understood that this is not necessarily the case. In particular, while not shown in FIG. 1, the operating environment 100 can include one or more databases or other data storage devices for storing the data 114 and/or other information. Thus the web server 112 can communicate with and/or obtain the data 114 from other entities not shown in FIG. 1.

According to various embodiments, the web server 112 hosts the resource 110 and/or the data 114 and provides these and/or other data to the user device 102. The resource 110 and/or the data 114 can be provided to the user device 102 in response to a request for the resource 110, in response to a request for the data 114, and/or at other times. The user device 102 can be configured to receive or otherwise obtain the data 114 and to store the data 114. In some embodiments, the user device 102 stores the data 114 in a cache 116.

The cache 116 can be a portion of memory or other data storage elements located at or in communication with the user device 102. According to various embodiments, the cache 116 corresponds to an HTML cache that can be implemented in JAVASCRIPT or other languages and/or scripts. As will be explained in more detail below, the user device 102 obtains the data 114 from the web server 112, and stores the data 114 in the cache 116. The user device 102 can control an amount of data 114 downloaded or received from the web server 112. In particular, the user device 102 can download or receive enough data 114 to render a defined number of data driven forms or views associated with the resource 110.

In some embodiments, the number of views for which the data 114 is downloaded can be set by user settings, device settings, application settings, and/or by an entity associated with the web server 112. The number can be varied based upon a number of considerations such as, for example, an available bandwidth associated with a network connection used to download the resource 110, an anticipated viewing or reading speed or time, an anticipated rendering speed, or the like. These and other considerations can be based upon analysis of operations at the user device 102, past use of the user device 102, and/or device or application settings. In other embodiments, a threshold number is defined, regardless of operation of the user device 102, for the amount of data 114 to be cached 116. In some embodiments, for example, the user device 102 maintains enough data 114 in the cache 116 to render three data driven forms and/or views or screen displays of the data driven forms ("views"). The three views can include, for example, a current view and two other views such as a previous view and a next view, two previous views, and/or two next views. Because any number and/or combination of data driven forms and/or views can be used as a threshold to control data caching, it should be understood that these embodiments are illustrative, and should not be construed as being limiting in any way. Diagrams schematically illustrating rendering of data driven forms as described herein are illustrated and described below with reference to FIGS. 3A-3C.

The user device 102 can be configured to execute one or more of the application programs 108 to render one or more user interfaces ("UIs") 118 corresponding to the data driven forms and/or views of the data driven forms. Because the UIs 118 can include the data 114 and/or can provide data driven forms associated with the resource 110, it should be understood that the UIs 118 referred to herein can be or can include data driven forms or views of the data driven forms. It should be understood that these embodiments are illustrative, and should not be construed as being limiting in any way.

According to various embodiments, the user device 102 accesses the resource 110. The resource 110 can be stored at the user device 102 or obtained from a web server 112. The user device 102 can cache the data 114, which can be data referenced by or associated with the resource 110. The amount of the data 114 cached by the user device 102 can be varied based upon a number of considerations. The data 114 can be stored in a cache 116 associated with or accessible by the user device 102.

The user device 102 can render one or more UIs 118 including the data 114 in data driven forms and can output the UIs 118, for example to a display device (not shown in FIG. 1) associated with the user device 102. In addition to rendering a data driven form corresponding to a current view, the user device 102 can render additional data driven forms corresponding to other views that include the data 114. In one contemplated embodiment, the user device 102 renders a current view, a previous view, and a next view. The current view can be displayed by the user device 102 and the other views can be hidden from view. The user device 102 can monitor activity at the user device 102 to determine if input is detected at the user device 102 for manipulating the UIs 118 and/or viewing other data driven forms or views thereof, as will be explained in more detail below with reference to FIG. 2.

If the user device 102 detects input for manipulating the UIs 118, the user device can interpret the input and can implement the input. In some embodiments, the user device 102 detects a "flick" touch gesture at a touch or multi-touchscreen and interprets the gesture as corresponding to a command to view a previous or next data driven form. In response to detecting this input and command, the user device 102 can hide the current data driven form, present one of the previously-hidden data driven forms as the new current view, optionally delete one of the previously-hidden data driven forms, and/or render a new hidden data driven form for presentation in response to further user input.

The user device 102 also can monitor the cache 116 to determine if the cache is "full." As used herein, a "full" cache can refer to a cache 116 that stores enough data 114 to render an additional data driven form if input is again detected by the user device 102. As such, if the user device 102 renders or maintains three views or data driven forms at any particular time, the user device 102 may maintain enough data 114 in the cache 116 to render five data driven forms. As such, if a user flicks or otherwise gestures or enters other commands to view a previous or next data driven form, a new data driven form can be rendered without downloading additional data 114 from the web server 112 or other entity. It should be understood that this embodiment is illustrative, and should not be construed as being limiting in any way.

If the user device 102 determines that the cache 116 is not full, the user device 102 can obtain additional data 114 and store the additional data 114 in the cache 116. Thus, the user device 102 can load the data 114 into the cache 116 asynchronously, relative to rendering a currently viewed data driven form and/or previous and next data driven forms. As such, a user of the user device 102 may not detect download of the data 114 and can be provided with a smooth and/or efficient user experience. These and other aspects of the concepts and technologies disclosed herein will be described in additional detail below, particularly with reference to FIGS. 2-4B.

FIG. 1 illustrates one user device 102, one network 104, and one web server 112. It should be understood, however, that some implementations of the operating environment 100 include multiple user devices 102, multiple networks 104, and/or multiple web servers 112. Thus, the illustrated embodiments should be understood as being illustrative, and should not be construed as being limiting in any way.

Figure 2:
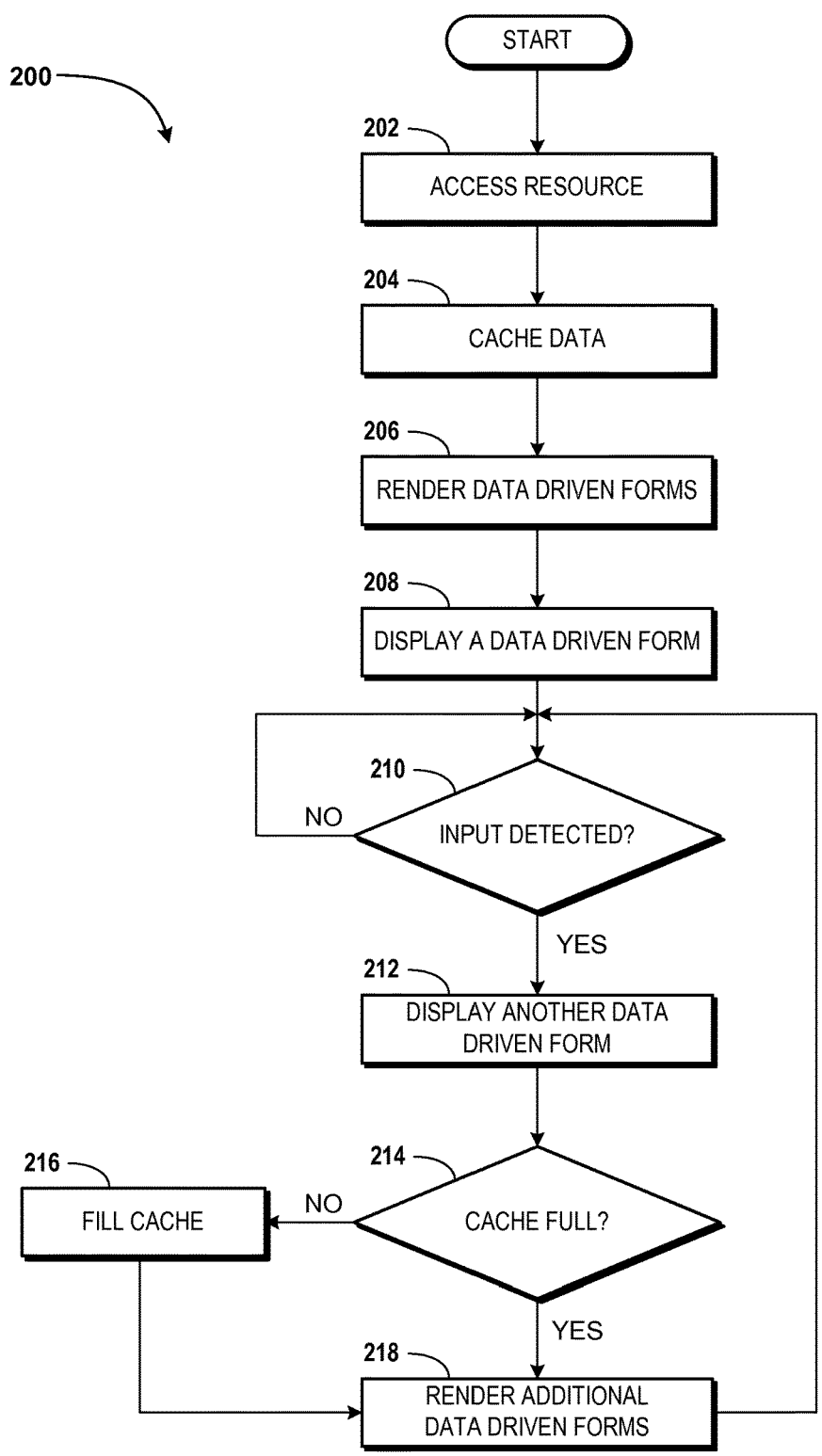
FIG. 2 is a flow diagram showing aspects of a method for presenting data driven forms, according to an illustrative embodiment.

Turning now to FIG. 2, aspects of a method 200 for presenting data driven forms will be described in detail. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 is described as being performed by the user device 102 via execution of one or more application programs 108. It should be understood that this embodiment is illustrative, and should not be viewed as being limiting in any way. In particular, other devices can provide the functionality of the method 200 described herein via execution of the application programs 108 and/or additional or alternative software elements.

The method 200 begins at operation 202, wherein the user device 102 accesses a resource 110. In some embodiments, as explained and illustrated above with reference to FIG. 1, the resource 110 is stored at and/or otherwise associated with the web server 112. Thus, in some embodiments the resource 110 corresponds to a web application, a web site, a web page, other sites, applications, or pages, files, other resources, or the like. The resource 110 also can be associated with data 114 that is used in rendering a data driven form corresponding to, or associated with, the resource 110. For example, the resource 110 can correspond to a contact management page including a data driven form for presenting data 114 corresponding to contact data or contact information stored at the web server 112 and/or at a contact database accessible to the web server 112. Similarly, the resource 110 can correspond to a web page having a data driven form for presenting information and the data 114 can correspond to the information presented in the data driven form. Because the resource 110 and the data 114 can correspond to various types of resources and/or data, it should be understood that these embodiments are illustrative, and should not be construed as being limiting in any way.

From operation 202, the method 200 proceeds to operation 204, wherein the user device 102 caches the data 114. According to various implementations, the user device 102 generates a request for the data 114 and passes the request to the web server 112 or other entity associated with the data 114. In response to the request, the user device 102 can receive the data 114 and/or can be allowed to access the data 114. In other embodiments, the user device 102 requests the resource 110 and in response to the request for the resource 110, the web server 112 responds with the resource 110 and/or the data 114.

Upon receiving the data 114 from the web server 112 or other entity, the user device 102 can store the data 114 in a memory device such as the cache 116. According to some embodiments, the user device 102 caches the data 114 using an HTML cache. As will be explained in more detail below, the user device 102 can be configured to generate views of data driven forms or other data driven elements from the data 114 stored in the cache 116 instead of, or in addition to, data 114 hosted at the web server 112 or other entities.

From operation 204, the method 200 proceeds to operation 206, wherein the user device 102 renders one or more windows, forms, or views corresponding to or including one or more data driven forms, as explained above in detail. Furthermore, the data driven forms can correspond to one or more of the UIs 118 described above with reference to FIG. 1. As explained above, the user device 102 is configured in various embodiments to render multiple data driven forms at a particular time. In addition to a currently viewed or displayed data driven form, the user device 102 can render one or more data driven forms included in one or more previous views, one or more next views, and/or combinations thereof.

According to various embodiments, the currently viewed data driven form is rendered and presented by the user device 102, while other data driven forms are rendered and hidden from view. The hidden data driven forms can be rendered without reloading web browser controls or otherwise obtaining the data 114 corresponding to the hidden data driven forms from the web server 112. After rendering the hidden data driven forms, the data driven forms can be ordered to enable "sliding" of the data driven forms to the right, left, up, or down, as is more clearly shown in FIGS. 2A-4C.

From operation 206, the method 200 proceeds to operation 208, wherein the user device 102 displays one of the data driven forms rendered in operation 206. According to various embodiments, the user device 102 presents a current data driven form, which can be defined by the resource 110 and/or by user input or settings. As explained above, the other data driven forms can be hidden from view and only the current data driven form may be shown in operation 208.

It should be understood that this embodiment is illustrative, and should not be construed as being limiting in any way.

From operation 208, the method 200 proceeds to operation 210, wherein the user device 102 determines if input is detected at the user device 102. In particular, the user device 102 can monitor activity at the user device 102 and determine if any input for manipulating a view presented by the user device 102 is detected. According to various embodiments of the concepts and technologies disclosed herein, the user device 102 can monitor activity to detect one or more touch gestures, one or more mouse gestures, one or more multi-touch gestures, or the like. Some illustrative gestures are described below with reference to FIG. 7. Briefly, a touch gesture can include, but is not limited to, a "flick" gesture, wherein a user places a finger, stylus, or other structure in contact with a touchscreen and moves the structure, for example, to the right or left. Because other gestures are contemplated and are possible, it should be understood that this embodiment is illustrative, and should not be construed as being limiting in any way.

If the user device 102 determines, in operation 208, that the input is not detected at the user device 102, the method 200 can return to operation 210 and the user device 102 can again determine if input is detected at the user device 102. As such, execution of the method 200 can pause at operation 210 until the user device 102 determines, in any iteration of operation 208, that input is detected at the user device 102.

If the user device 102 determines, in operation 210, that input is detected at the user device 102, the method 200 can proceed to operation 212. At operation 212, the user device 102 displays another data driven form. In particular, as explained above with reference to operation 206, the user device 102 can render multiple data driven forms in operation 206 and can display one of the data driven forms in operation 208. Thus, additional rendered data driven forms can be previously rendered and hidden when the input detected in operation 210 is received. As such, instead of fetching data 114 for a next view or data driven form, the user device 102 can present another data driven form such as, for example, a next data driven form, a previous data driven form, or other data driven form.

In some embodiments, the data driven forms can be generated based upon the data 114 stored in the cache 116 and, as such, the user device 102 can eliminate or reduce communications between the user device 102 and the web server 112 to generate the data driven forms. Thus, communications between the user device 102 and the web server 112 can be avoided or eliminated between displays of the data driven forms. As such, some embodiments of the concepts and technologies disclosed herein enable reduction or elimination of perceived latency and/or delays during display of various data driven forms.

From operation 212, the method 200 proceeds to operation 214, wherein the user device 102 determines if the cache 116 is full. As used herein, a "full" cache 116 refers to a cache 116 that stores enough or sufficient data to render a specified number of data driven forms and not necessarily to a cache 116 that stores data 114 to a capacity of the cache 116. More particularly, in some embodiments the user device 102 is configured to maintain a cache storing enough data 114 to generate three data driven forms including, but not limited to, a current data driven form and two or more neighboring data driven forms such as a previous data driven form and a next data driven form, two next data driven forms, two previous data driven forms, or the like. It should be understood that data 114 corresponding to more than three data driven forms can be cached and/or maintained in the cache 116. As such, the above examples should be understood as being illustrative and should not be construed as being limiting in any way.

If the user device 102 determines, in operation 214, that the cache 116 is not full as defined herein, the method 200 proceeds to operation 216, wherein the user device 102 can fill the cache 116. In particular, the user device 102 can request data 114 from the web server 112 or other entity hosting the data 114. According to various embodiments, the user device 102 can request the data 114 for filing the cache 116 asynchronously with respect to rendering the views as sown in operation 206. In particular, the user device 102 can obtain the data 114 when the data 114 is not needed for rendering. As such, download of the data 114 and/or delays or latency experienced by users viewing the data 114 can be reduced or eliminated, thereby improving the user experience relative to downloading the data 114 when a data driven form is requested.

From operation 216, or from operation 214 if the user device 102 determines, in operation 214, that the cache is full as defined herein, the method 200 proceeds to operation 218. At operation 218, the user device 102 renders one or more additional data driven forms. It can be appreciated from the above description of operations 214-216 that the data driven forms rendered in operation 218 can correspond to data driven forms rendered by the user device 102 using the data 114 obtained in operation 216 and/or using the data 114 stored in the cache 116 in operation 204.

In some embodiments, the user device 102 is configured to render an additional data driven form in response to a command or input as described above with reference to operation 210. Thus, the user device 102 can be configured to maintain a number of data driven forms at any given time, such that users scrolling, flicking, or otherwise navigating through the data driven forms may not experience delays while the requested view is rendered and/or while the data 114 associated with the data driven form is obtained.

In other embodiments, the data driven forms are rendered based upon time considerations and/or based upon a threshold number of data driven forms to be maintained at any given time. Thus, for example, the user device 102 may obtain new data 114 after a particular time period has lapsed from the previous download of the data 114. Thus, the concepts and technologies disclosed herein can be used to present the data 114 in data driven forms even if the data 114 corresponds to rapidly changing or evolving data. Because various schemes can be used to manage how many and when the data driven forms are rendered, it should be understood that these embodiments are illustrative, and should not be construed as being limiting in any way.

From operation 218, the method 200 returns to operation 210, wherein the user device 102 again monitors activity at the user device 102 for input. It should be understood that the method 200 can be ended at any time. Furthermore, it should be understood that the method 200 can be repeated any number of times, if desired.

Figure 3A:
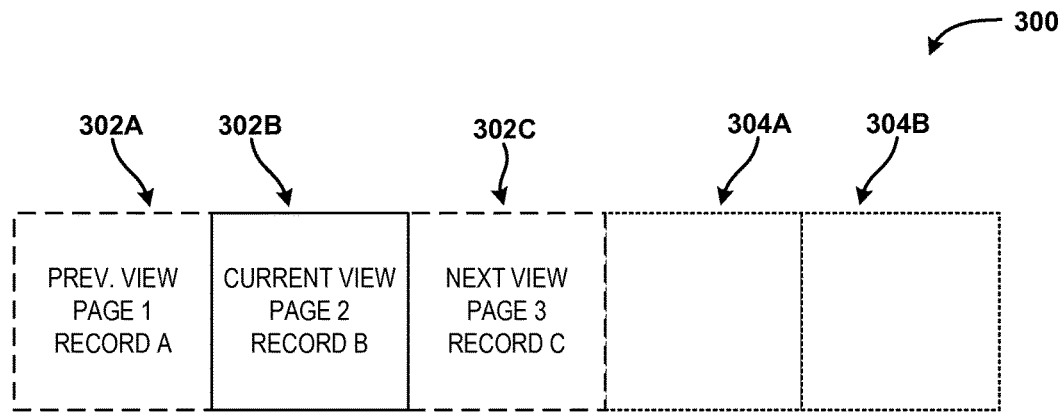
FIGS. 3A-3C are block diagrams schematically illustrating rendering multiple views for presenting data driven forms, according to an illustrative embodiment.
Figure 3B:
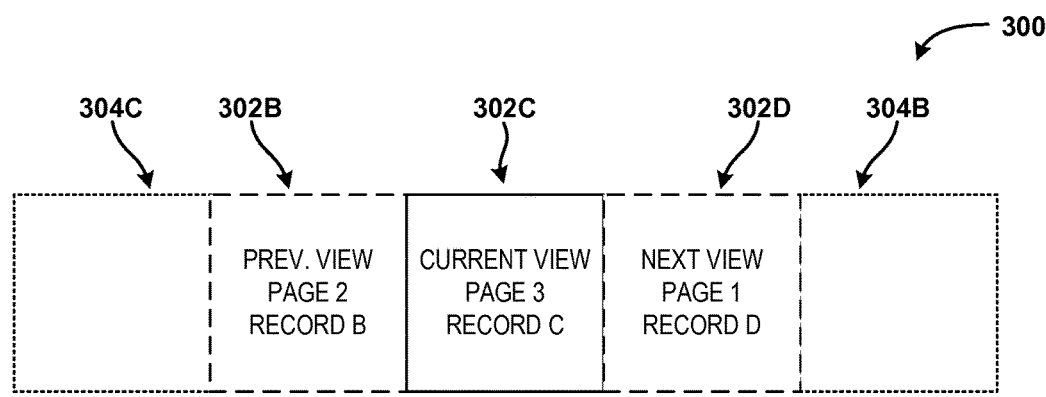
Figure 3C:
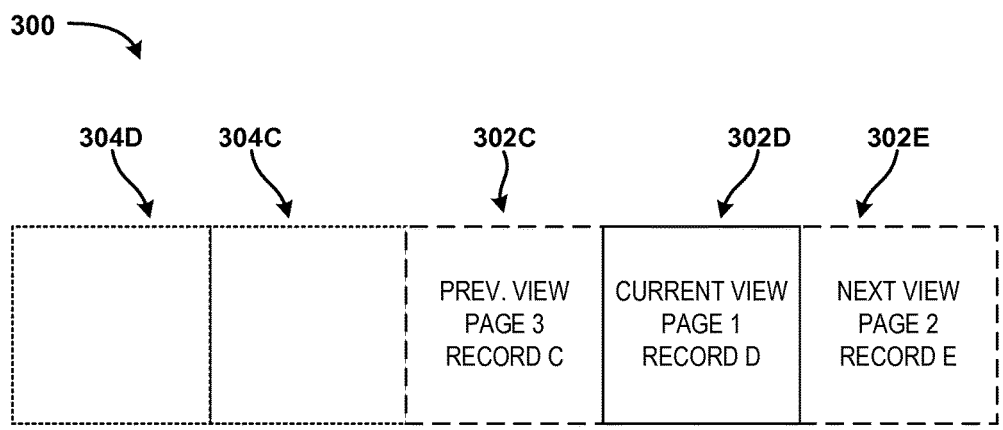

Turning now to FIGS. 3A-3C, additional aspects of the concepts and technologies disclosed herein for presenting data driven forms are described. In particular, FIGS. 3A-3C are block diagrams schematically illustrating a set of rendered views ("a viewset") 300, according to an illustrative embodiment. As explained above, "views" and/or a set thereof such as the viewset 300 can correspond to screen displays for presenting one or more rendered data driven forms or views thereof. As such, the views and/or the viewset 300 can correspond to one or more or a set of the UIs 118 described above with reference to FIGS. 1-2. The viewset 300 shown in FIG. 3A includes three views 302 ("views") 302A-C (hereinafter generically and/or collectively referred to as "views 302"). Because any number of views 302 can be included in the viewset 300, it should be understood that this embodiment is illustrative, and should not be construed as being limiting in any way.

The viewset 300 also includes two empty slots 304A-B (hereinafter generically and/or collectively referred to as "slots 304"). The slots 304 can correspond to conceptual slots for moving, reordering, and/or rendering the views 302, as will be explained in more detail below. It should be understood that the slots 304 shown in FIGS. 3A-3C are included for purposes of illustrating and describing the concepts and technologies disclosed herein and may be omitted from various embodiments and/or that more than two slots 304 may be included. Thus, the illustrated embodiments shown in FIGS. 3A-3C are illustrative, and should not be construed as being limiting in any way.

Referring now to FIG. 3A, the view 302A can correspond to a previous view. As used herein, a "previous view" can correspond to a view of a data driven form presenting data 114 from a record that neighbors a record presented in a data driven form of a data driven form presented in a current view 302B. As such, the "previous view" need not have been previously displayed. Rather, the word "previous" can be used to refer to a previous or otherwise neighboring record in the data 114 and/or to other neighboring records in the data 114. The views 302 can correspond to rendered views 302, with the current view 302B corresponding to a view that is currently displayed on a display screen or other display device associated with the user device 102 and the views 302A, 302C corresponding to views hidden from a display screen of the user device 102 but displayed in response to detecting input at the user device 102, as described above with reference to FIG. 2. Some example screen displays that can be generated at the user device 102 are illustrated and described below with reference to FIGS. 4A-4C.

FIG. 3B illustrates an example scenario in which a user scrolls, flicks, or otherwise inputs a gesture or other command for viewing a next view 302C when viewing a current view 302B as shown in FIG. 3A. As shown in FIG. 3B, the user device 102 can modify the views 302 shown in FIG. 3A in response to detecting input at the user device 102. Although not visible in FIG. 3B, the view 302A can be discarded by the user device 102, for example, by deleting the rendered image corresponding to the view 302A from a rendering cache and/or removing the data 114 corresponding to the view 302A from the cache 116, among other actions.

Additionally, the user device 102 can render a new view 302D including a data driven form presenting data 114 stored in the cache 116. The user device 102 also can move the view 302B to a position corresponding to the previous position of the view 302A. As such, the view 302B can be hidden in FIG. 3B and the next view 302C can be moved to a position corresponding to the previous visible position of the view 302B. Thus, in FIG. 3B, the view 302C can correspond to a current view and the views 302B and 302D can correspond to hidden views. In place of the previous view 302A, a new slot 304C can be created, if desired, though this is not necessarily the case. It should be understood that this embodiment is illustrative and should not be construed as being limiting in any way.

FIG. 3C illustrates an example scenario in which a user scrolls, flicks, or otherwise inputs a gesture or other command for viewing a next view 302D when viewing a current view 302C as shown in FIG. 3A. As shown in FIG. 3C, the user device 102 can modify the views 302 shown in FIG. 3B in response to detecting input at the user device 102. As mentioned above, the view 302B can be discarded by the user device 102, if desired.

As shown in FIG. 3C, the user device 102 can render a new view 302E including a data driven form presenting the data 114 stored in the cache 116. The user device 102 also can move the view 302C to a position corresponding to the previous position of the view 302B. Thus, the view 302C can be hidden in FIG. 3C and the view 302D can be moved to a position corresponding to the previous position of the view 302C and made visible. Thus, in FIG. 3C, the view 302D can correspond to a current view and the views 302C and 302E can correspond to hidden views. In place of the previous view 302B, a new slot 304D can be created, if desired, though this is not necessarily the case. It should be understood that this embodiment is illustrative and should not be construed as being limiting in any way.

From the above description of FIGS. 3A-3C, it can be appreciated that multiple views 302 can be managed by the user device 102 and hidden or shown in response to detecting input at the user device 102. Similarly, it can be appreciated that as the views 302 are scrolled or slid in response to user input, that other views 302 can be deleted, discarded, rendered, hidden, and/or shown, as explained above. While only three views 302 are described above with regard to FIGS. 3A-3C, it should be understood from the above description that any number of visible and/or hidden views 302 can be managed by the user device 102, based upon performance, screen display size, processing power, available networking bandwidth, size of the cache 116, and/or other considerations.

Figure 4A:
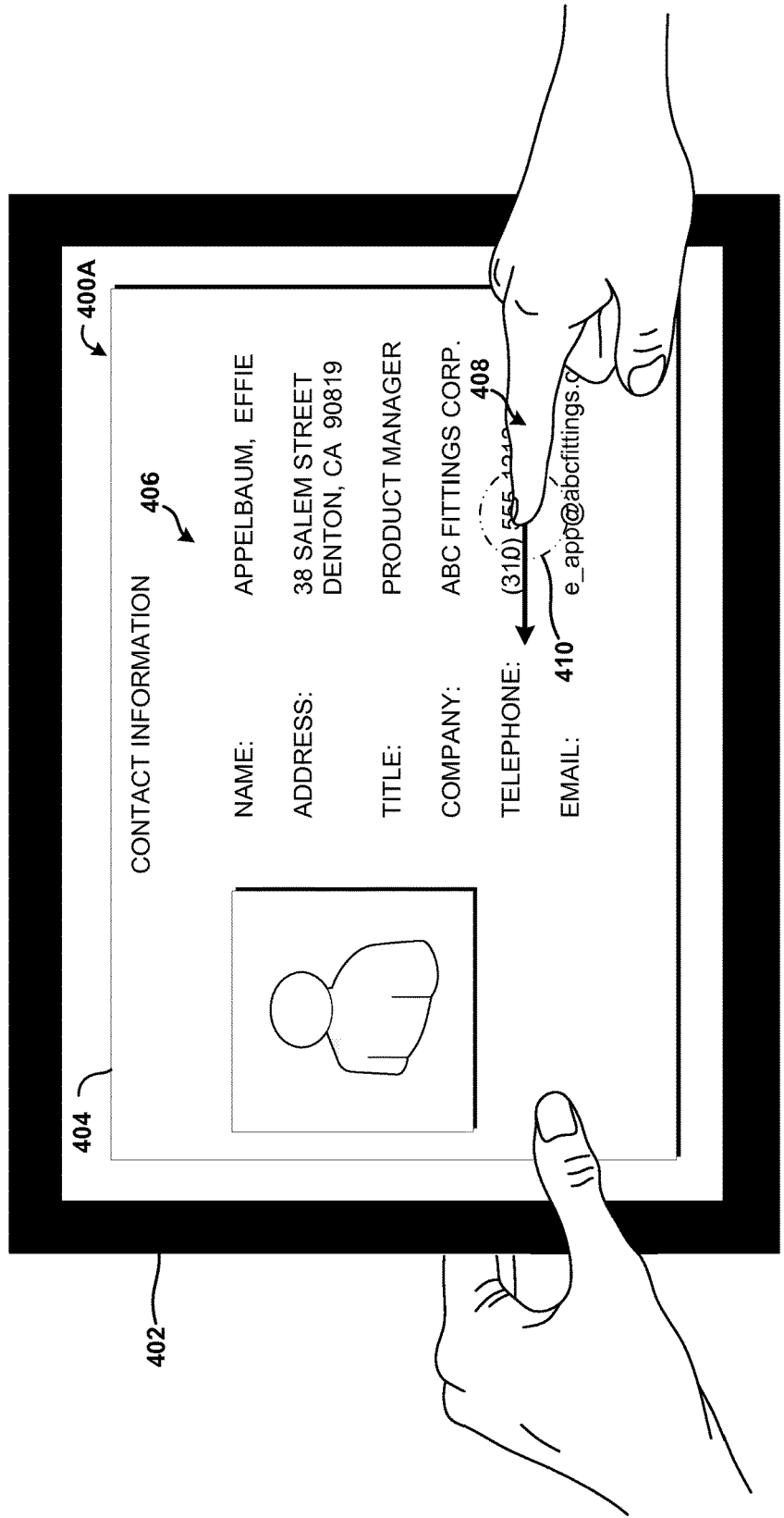
Figure 4C:
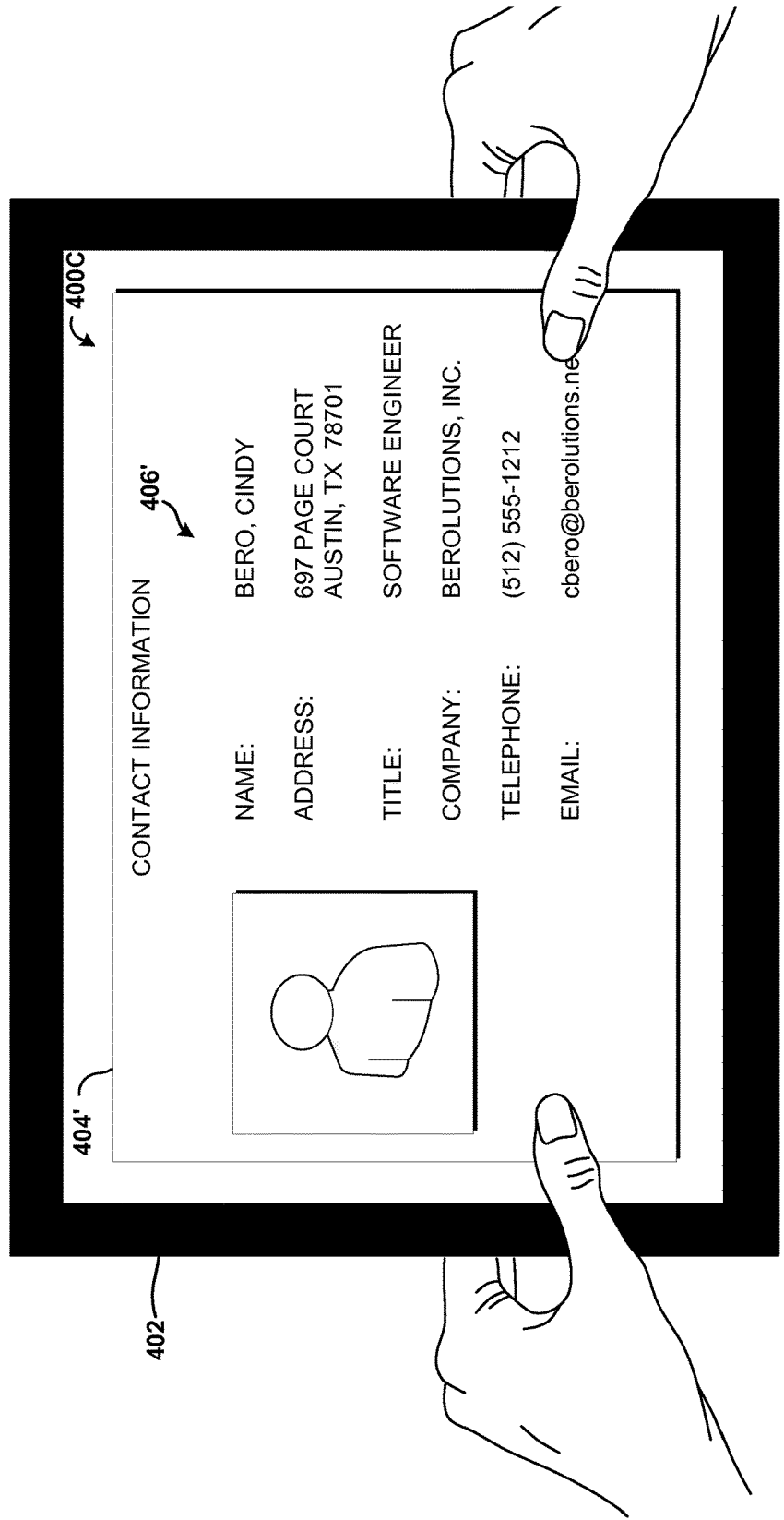

Turning now to FIGS. 4A-4C, UI diagrams showing various aspects of the concepts and technologies disclosed herein for presenting data driven forms will be described according to various illustrative embodiments. In particular, FIG. 4A shows a screen display 400A generated by one or more of the application programs 108 executing at the user device 102. The screen display 400A can correspond, in some embodiments, to one of the UIs 118 described above with reference to FIG. 1, though this is not necessarily the case. In the illustrated embodiment, the screen display 400A is displayed on a tablet computing device 402. It should be understood that this is one embodiment of presenting data driven forms as disclosed herein and should not be construed as being limiting in any way.

As shown in FIG. 4A, screen display 400A includes a data driven form 404, which can correspond to a visible view 302 as described above with regard to FIGS. 3A-3C. It therefore should be appreciated that, although not visible in FIG. 4A, data driven forms 404 can be rendered but in an invisible area of display space or in a rendering cache that is not visible to a user. In the illustrated embodiment, the data driven form 404 contains contact information 406 corresponding to a record from a contact database or other information stored as the data 114. As explained above, the data 114 can be obtained by the user device 102 and stored in the cache 116. The cached data 114 can be used to generate the data driven form 404 as well as other hidden data driven forms 404 and/or views 302.

In the embodiment shown in FIG. 4A, a user flicks or slides a finger 408 from a contact area 410 toward a left side of the tablet 402. In response to detecting this input, the tablet 402 or other implementation of the user device 102 can modify the screen display 400A to provide a next view 302, a previous view 302, and/or another data driven form 404 as explained above. An example of such an embodiment is illustrated below with reference to FIG. 4C. Because other types of input can be detected by the tablet 402 and/or other implementation of the user device 102 to display other views 302, it should be understood that this embodiment is illustrative, and should not be construed as being limiting in any way.

Turning now to FIG. 4B, additional aspects of the concepts and technologies disclosed herein for presenting data driven forms will be described. In particular, FIG. 4B shows a screen display 400B generated by the tablet 402 or other user device 102 in response to detecting the input illustrated in FIG. 4A or other input for showing an additional view 302 or data driven form 404. As shown in FIG. 4B, another view 302 or a next data driven form 404' can be scrolled into the screen display 400B upon detecting the gesture or other command. In the illustrated embodiment, the next data driven form 404' is scrolled into the screen display 400B in conjunction with movement of the finger 408, though this is not necessarily the case. Thus, portions of the data driven form 404 and/or the next data driven form 404' can simultaneously be displayed on the screen display 400B. In other embodiments, the next data driven form 404' can be displayed without the scrolling or sliding illustrated in FIG. 4B. As such, the embodiment illustrated in FIG. 4B is illustrative and should not be construed as being limiting in any way.

Turning now to FIG. 4C, additional aspects of the concepts and technologies disclosed herein for presenting data driven forms will be described. In particular, FIG. 4C shows a screen display 400C generated by the tablet 402 or other user device 102 in response to detecting the input illustrated in FIG. 4A or other input for showing an additional view 302 or data driven form 404. As shown in FIG. 4C, the next data driven form 404' can be displayed in response to the input illustrated in FIG. 4A. As explained above with reference to FIG. 4B, the screen display 400C can be displayed by the tablet 402 or other user device 102 with or without displaying intermediate views as shown in FIG. 4B. In the illustrated embodiment, the next data driven form 404' is displayed on the screen display 400C and corresponding contact information 406' can be displayed.

As explained herein in detail, the tablet 402 or other user device 102 can display the next data driven form 404' without obtaining data 114 from a web server 112 or other device. Rather, the data 114 corresponding to the contact information 406' can be obtained from the cache 116. Thus, display of the next data driven form 404' can be completed by the user device 102 without conducting any additional communications. As such, some embodiments of the concepts and technologies disclosed herein can provide smooth and quick display of multiple data driven forms without requiring native applications and/or excessive network communications. It should be understood that these embodiments are illustrative, and should not be construed as being limiting in any way.

Figure 5:
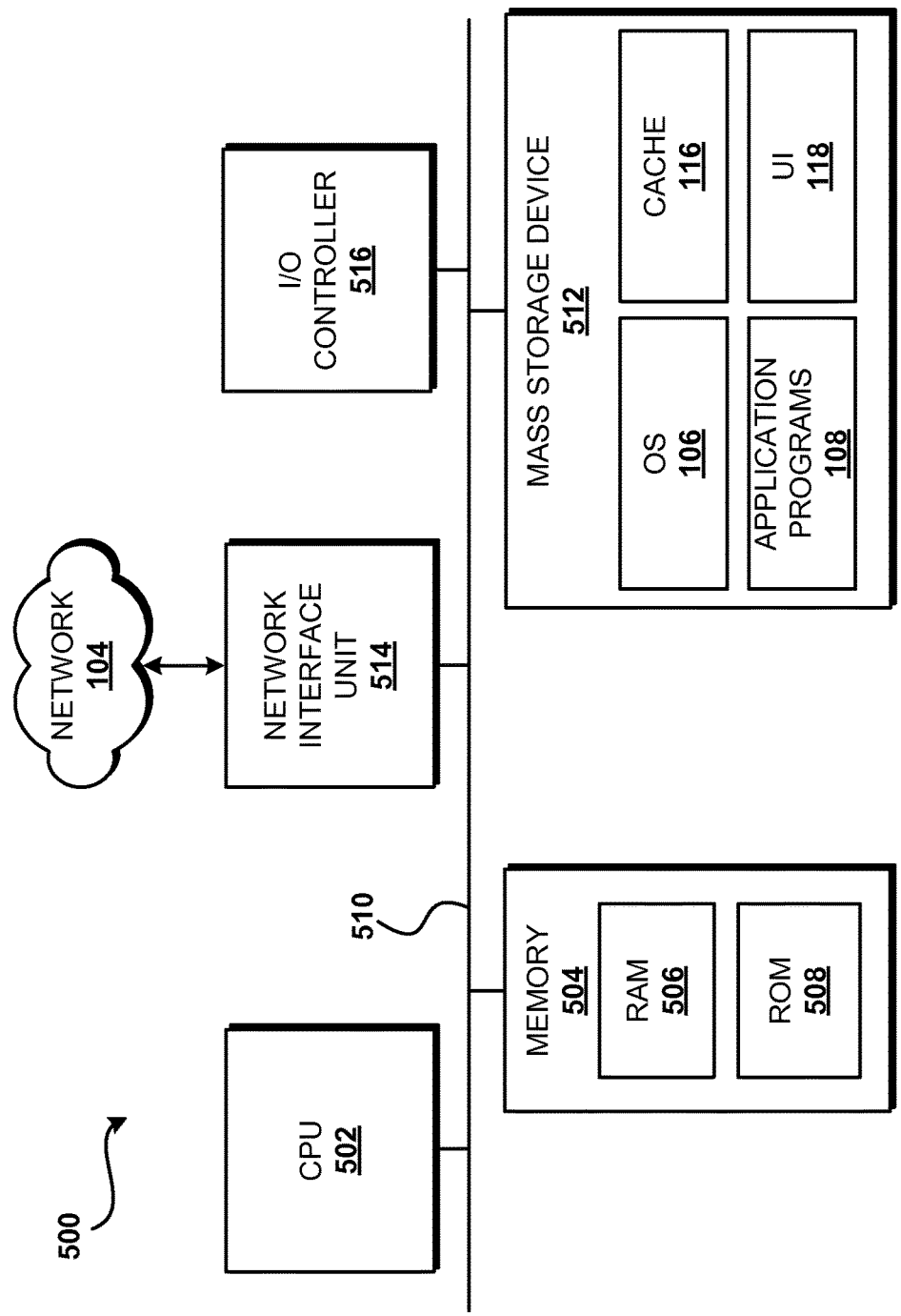
FIG. 5 is a computer architecture diagram illustrating an illustrative computer hardware and software architecture for a computing system capable of implementing aspects of the embodiments presented herein.

FIG. 5 illustrates an illustrative computer architecture 500 for a device capable of executing the software components described herein for presenting data driven forms. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 106, the application programs 108, the cache 116, and the UIs 118. Although not shown in FIG. 5, the mass storage device 512 also can be configured to store the resource 110 and the data 114, which can be in the cache 116, if desired.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 514 connected to the bus 510. It should be appreciated that the network interface unit 514 also may be utilized to connect to other types of networks and remote computer systems, for example, the web server 112. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
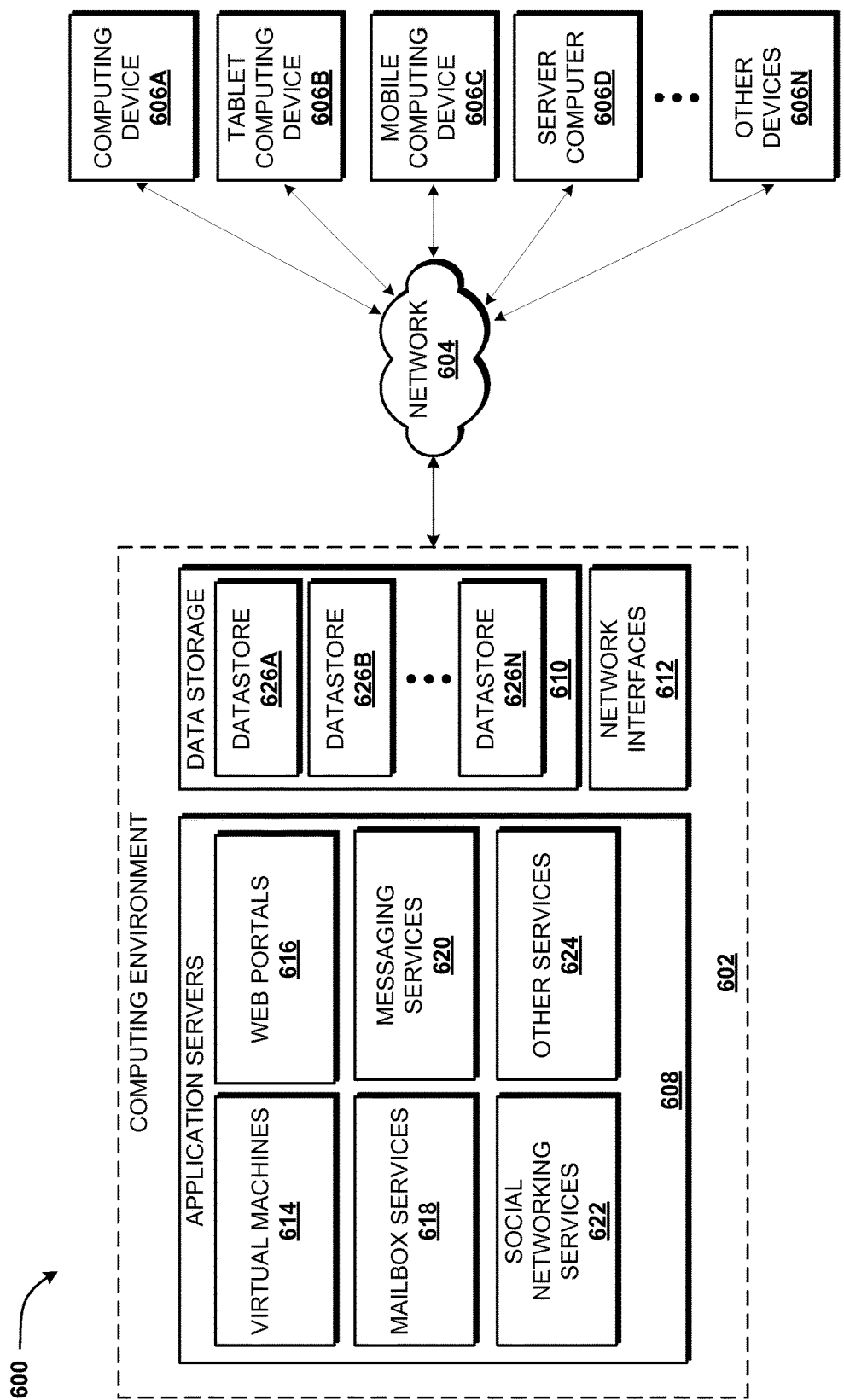
FIG. 6 is a diagram illustrating a distributed computing environment capable of implementing aspects of the embodiments presented herein.

FIG. 6 illustrates an illustrative distributed computing environment 600 capable of executing the software components described herein for presenting data driven forms. Thus, the distributed computing environment 600 illustrated in FIG. 6 can be used to provide the functionality described herein with respect to the user device 102 and/or the web server 112. The distributed computing environment 600 thus may be utilized to execute any aspects of the software components presented herein.

According to various implementations, the distributed computing environment 600 includes a computing environment 602 operating on, in communication with, or as part of the network 604. The network 604 also can include various access networks. According to various implementations, the functionality of the network 604 is provided by the network 104 illustrated in FIGS. 1 and 5. One or more client devices 606A-606N (hereinafter referred to collectively and/or generically as "clients 606") can communicate with the computing environment 602 via the network 604 and/or other connections (not illustrated in FIG. 6). In the illustrated embodiment, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limited in any way.

In the illustrated embodiment, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated embodiment, the application servers 608 host one or more virtual machines 614 for hosting applications or other functionality. According to various implementations, the virtual machines 614 host one or more applications and/or software modules for providing the functionality described herein for presenting data driven forms. It should be understood that this embodiment is illustrative, and should not be construed as being limiting in any way. The application servers 608 also host or provide access to one or more Web portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also can include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 622 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 622 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above embodiments are illustrative, and should not be construed as being limited in any way.

As shown in FIG. 6, the application servers 608 also can host other services, applications, portals, and/or other resources ("other resources") 624. It thus can be appreciated that the computing environment 602 can provide integration of the concepts and technologies disclosed herein provided herein for presenting data driven forms with various mailbox, messaging, social networking, and/or other services or resources. For example, the concepts and technologies disclosed herein can be used to allow users to view messages, social network connection information, and/or other data in data driven forms that can be presented in accordance with the concepts and technologies disclosed herein.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store the resource 110, the data 114, and/or other data, if desired.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 600 to utilize the functionality described herein for presenting data driven forms.

Figure 7:
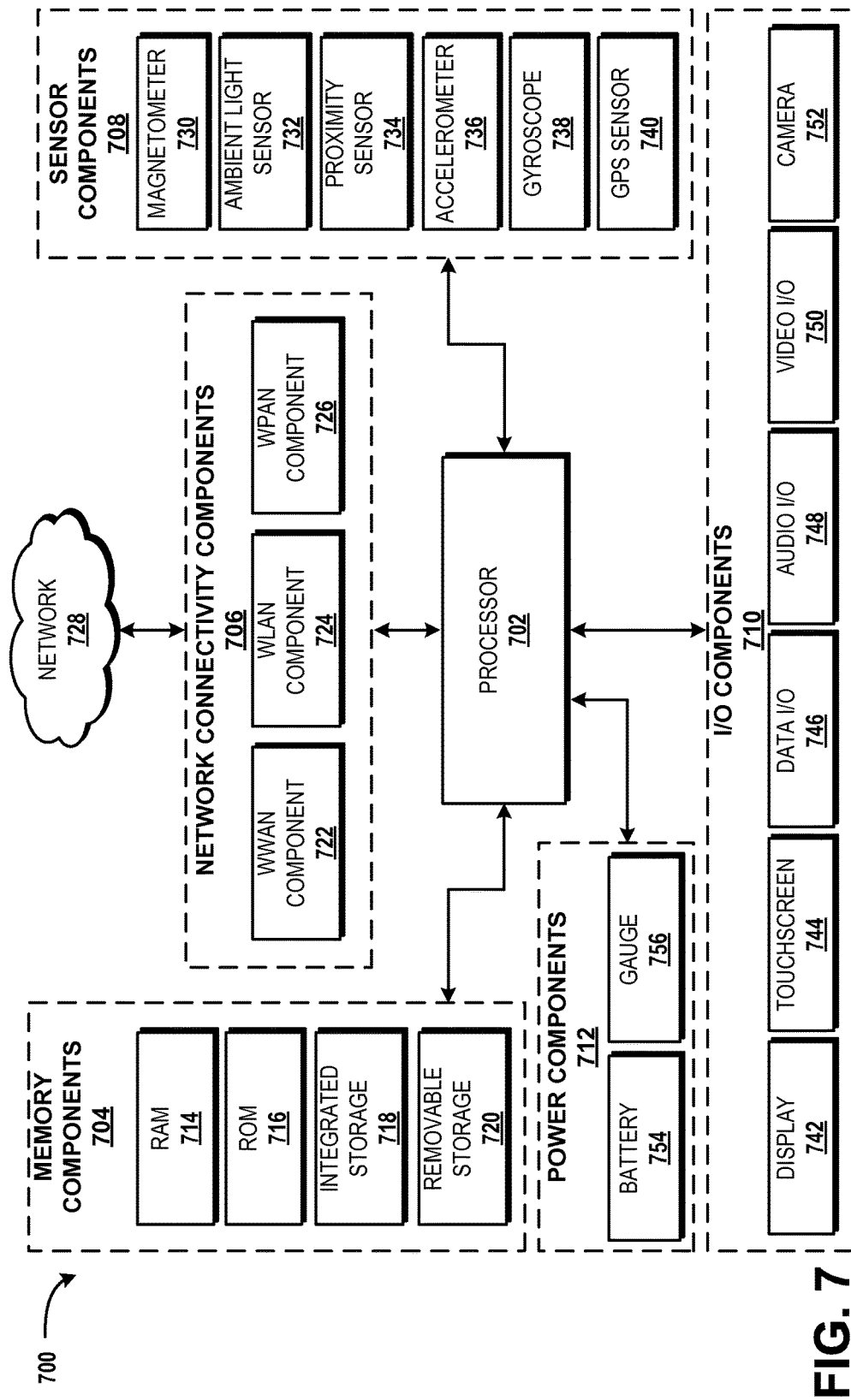
FIG. 7 is a computer architecture diagram illustrating a computing device architecture capable of implementing aspects of the embodiments presented herein.

Turning now to FIG. 7, an illustrative computing device architecture 700 for a computing device that is capable of executing various software components described herein for presenting data driven forms. The computing device architecture 700 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 700 is applicable to any of the clients 706 shown in FIG. 6. Furthermore, aspects of the computing device architecture 700 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated embodiment, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some embodiments, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some embodiments, the processor 702 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some embodiments, the processor 702 is fabricated, in part, utilizing a package-on-package ("PoP") integrated circuit packaging technique. Moreover, the processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some embodiments, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some embodiments, the RAM 714 or a portion thereof, the ROM 716 or a portion thereof, and/or some combination the RAM 714 and the ROM 716 is integrated in the processor 702. In some embodiments, the ROM 716 is configured to store a firmware, an operating system or a portion thereof (e.g., operating system kernel), and/or a bootloader to load an operating system kernel from the integrated storage 718 or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some embodiments, the removable storage 720 is provided in lieu of the integrated storage 718. In other embodiments, the removable storage 720 is provided as additional optional storage. In some embodiments, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from a network 728, which may be a WWAN, a WLAN, or a WPAN. Although a single network 728 is illustrated, the network connectivity components 706 may facilitate simultaneous communication with multiple networks. For example, the network connectivity components 706 may facilitate simultaneous communications with multiple networks via one or more of a WWAN, a WLAN, or a WPAN.

In some embodiments, the network 728 is provided by the networks 104 and/or 604. In some embodiments, the network 728 includes the networks 104 and/or 604. In other embodiments, the network 728 provides access to the networks 104 and/or 604. The network 728 may be a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 728 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 728 may be configured to provide voice and/or data communications with any combination of the above technologies. The network 728 may be configured to or adapted to provide voice and/or data communications in accordance with future generation technologies.

In some embodiments, the WWAN component 722 is configured to provide dual- multi-mode connectivity to the network 728. For example, the WWAN component 722 may be configured to provide connectivity to the network 728, wherein the network 728 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 728 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 724 is configured to connect to the network 728 via the WI-FI access points. Such connections may be secured via various encryption technologies including, but not limited, WI-FI Protected Access ("WPA"), WPA2, Wired Equivalent Privacy ("WEP"), and the like.

The network 728 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 726 is configured to facilitate communications with other devices, such as peripherals, computers, or other computing devices via the WPAN.

The sensor components 708 include a magnetometer 730, an ambient light sensor 732, a proximity sensor 734, an accelerometer 736, a gyroscope 738, and a Global Positioning System sensor ("GPS sensor") 740. It is contemplated that other sensors, such as, but not limited to, temperature sensors or shock detection sensors, also may be incorporated in the computing device architecture 700.

The magnetometer 730 is configured to measure the strength and direction of a magnetic field. In some embodiments the magnetometer 730 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 730 are contemplated.

The ambient light sensor 732 is configured to measure ambient light. In some embodiments, the ambient light sensor 732 provides measurements to an application program stored within one the memory components 704 in order to automatically adjust the brightness of a display (described below) to compensate for low-light and high-light environments. Other uses of measurements obtained by the ambient light sensor 732 are contemplated.

The proximity sensor 734 is configured to detect the presence of an object or thing in proximity to the computing device without direct contact. In some embodiments, the proximity sensor 734 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 734 are contemplated.

The accelerometer 736 is configured to measure proper acceleration. In some embodiments, output from the accelerometer 736 is used by an application program as an input mechanism to control some functionality of the application program. For example, the application program may be a video game in which a character, a portion thereof, or an object is moved or otherwise manipulated in response to input received via the accelerometer 736. In some embodiments, output from the accelerometer 736 is provided to an application program for use in switching between landscape and portrait modes, calculating coordinate acceleration, or detecting a fall. Other uses of the accelerometer 736 are contemplated.

The gyroscope 738 is configured to measure and maintain orientation. In some embodiments, output from the gyroscope 738 is used by an application program as an input mechanism to control some functionality of the application program. For example, the gyroscope 738 can be used for accurate recognition of movement within a 3D environment of a video game application or some other application. In some embodiments, an application program utilizes output from the gyroscope 738 and the accelerometer 736 to enhance control of some functionality of the application program. Other uses of the gyroscope 738 are contemplated.

The GPS sensor 740 is configured to receive signals from GPS satellites for use in calculating a location. The location calculated by the GPS sensor 740 may be used by any application program that requires or benefits from location information. For example, the location calculated by the GPS sensor 740 may be used with a navigation application program to provide directions from the location to a destination or directions from the destination to the location. Moreover, the GPS sensor 740 may be used to provide location information to an external location-based service, such as E911 service. The GPS sensor 740 may obtain location information generated via WI-FI, WIMAX, and/or cellular triangulation techniques utilizing one or more of the network connectivity components 706 to aid the GPS sensor 740 in obtaining a location fix. The GPS sensor 740 may also be used in Assisted GPS ("A-GPS") systems.

The I/O components 710 include a display 742, a touchscreen 744, a data I/O interface component ("data I/O") 746, an audio I/O interface component ("audio I/O") 748, a video I/O interface component ("video I/O") 750, and a camera 752. In some embodiments, the display 742 and the touchscreen 744 are combined. In some embodiments two or more of the data I/O component 746, the audio I/O component 748, and the video I/O component 750 are combined. The I/O components 710 may include discrete processors configured to support the various interface described below, or may include processing functionality built-in to the processor 702.

The display 742 is an output device configured to present information in a visual form. In particular, the display 742 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 742 is a liquid crystal display ("LCD") utilizing any active or passive matrix technology and any backlighting technology (if used). In some embodiments, the display 742 is an organic light emitting diode ("OLED") display. Other display types are contemplated.

The touchscreen 744 is an input device configured to detect the presence and location of a touch. The touchscreen 744 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 744 is incorporated on top of the display 742 as a transparent layer to enable a user to use one or more touches to interact with objects or other information presented on the display 742. In other embodiments, the touchscreen 744 is a touch pad incorporated on a surface of the computing device that does not include the display 742. For example, the computing device may have a touchscreen incorporated on top of the display 742 and a touch pad on a surface opposite the display 742.

In some embodiments, the touchscreen 744 is a single-touch touchscreen. In other embodiments, the touchscreen 744 is a multi-touch touchscreen. In some embodiments, the touchscreen 744 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 744. As such, a developer may create gestures that are specific to a particular application program.

In some embodiments, the touchscreen 744 supports a tap gesture in which a user taps the touchscreen 744 once on an item presented on the display 742. The tap gesture may be used for various reasons including, but not limited to, opening or launching whatever the user taps. In some embodiments, the touchscreen 744 supports a double tap gesture in which a user taps the touchscreen 744 twice on an item presented on the display 742. The double tap gesture may be used for various reasons including, but not limited to, zooming in or zooming out in stages. In some embodiments, the touchscreen 744 supports a tap and hold gesture in which a user taps the touchscreen 744 and maintains contact for at least a pre-defined time. The tap and hold gesture may be used for various reasons including, but not limited to, opening a context-specific menu.

In some embodiments, the touchscreen 744 supports a pan gesture in which a user places a finger on the touchscreen 744 and maintains contact with the touchscreen 744 while moving the finger on the touchscreen 744. The pan gesture may be used for various reasons including, but not limited to, moving through screens, images, or menus at a controlled rate. Multiple finger pan gestures are also contemplated. In some embodiments, the touchscreen 744 supports a flick gesture in which a user swipes a finger in the direction the user wants the screen to move. The flick gesture may be used for various reasons including, but not limited to, scrolling horizontally or vertically through menus or pages. Additionally, the flick gesture can be used to view the UIs 118 as explained above with reference to FIGS. 3A-4C, if desired, although other gestures or commands also are contemplated as being suitable for these and other purposes. In some embodiments, the touchscreen 744 supports a pinch and stretch gesture in which a user makes a pinching motion with two fingers (e.g., thumb and forefinger) on the touchscreen 744 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 744. As such, the above gestures should be understood as being illustrative and should not be construed as being limiting in any way.

The data I/O interface component 746 is configured to facilitate input of data to the computing device and output of data from the computing device. In some embodiments, the data I/O interface component 746 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 748 is configured to provide audio input and/or output capabilities to the computing device. In some embodiments, the audio I/O interface component 746 includes a microphone configured to collect audio signals. In some embodiments, the audio I/O interface component 746 includes a headphone jack configured to provide connectivity for headphones or other external speakers. In some embodiments, the audio interface component 748 includes a speaker for the output of audio signals. In some embodiments, the audio I/O interface component 746 includes an optical audio cable out.

The video I/O interface component 750 is configured to provide video input and/or output capabilities to the computing device. In some embodiments, the video I/O interface component 750 includes a video connector configured to receive video as input from another device (e.g., a video media player such as a DVD or BLURAY player) or send video as output to another device (e.g., a monitor, a television, or some other external display). In some embodiments, the video I/O interface component 750 includes a High-Definition Multimedia Interface ("HDMI"), mini-HDMI, micro-HDMI, DisplayPort, or proprietary connector to input/output video content. In some embodiments, the video I/O interface component 750 or portions thereof is combined with the audio I/O interface component 748 or portions thereof.

The camera 752 can be configured to capture still images and/or video. The camera 752 may utilize a charge coupled device ("CCD") or a complementary metal oxide semiconductor ("CMOS") image sensor to capture images. In some embodiments, the camera 752 includes a flash to aid in taking pictures in low-light environments. Settings for the camera 752 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 754, which can be connected to a battery gauge 756. The batteries 754 may be rechargeable or disposable. Rechargeable battery types include, but are not limited to, lithium polymer, lithium ion, nickel cadmium, and nickel metal hydride. Each of the batteries 754 may be made of one or more cells.

The battery gauge 756 can be configured to measure battery parameters such as current, voltage, and temperature. In some embodiments, the battery gauge 756 is configured to measure the effect of a battery's discharge rate, temperature, age and other factors to predict remaining life within a certain percentage of error. In some embodiments, the battery gauge 756 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via a power I/O component 744.

Based on the foregoing, it should be appreciated that technologies for presenting data driven forms have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method to provide a web-based data driven form without use of a native application on a user device, the method comprising:
   accessing, from a web server at the user device, a web page resource that is associated with data used in rendering the web-based data driven form at the user device that corresponds to the web page resource;
   asynchronously caching, in a cache at the user device, data for rendering a predetermined number of views for the web-based data driven form, the asynchronously caching being relative to the rendering of the predetermined number of views and resulting in a reduction of perceived latency in display of the web-based data driven form, a number of the predetermined number of views being based on an anticipated viewing speed or an anticipated rendering speed;
   rendering, at the user device in a manner not visible to a user, the predetermined number of views for the web-based data driven form using the cached data, each of the rendered predetermined number of views comprising a view of the web-based data driven form that includes at least portion of the cached data;
   displaying a first of the rendered predetermined number of views for the web-based data driven form and hiding other views of the rendered predetermined number of views for the web-based data driven form;
   detecting, at the user device, input corresponding to a command for displaying a second of the rendered predetermined number of views for the web-based data driven form; and
   in response to the detecting, displaying the second of the rendered predetermined number of views.

2. The method of claim 1, wherein the input comprises a touch gesture detected at a touchscreen associated with the user device.

3. The method of claim 1, wherein the cache comprises an HTML cache.

4. The method of claim 1, wherein displaying the second of the rendered predetermined number of views for the web-based data driven form comprises:
   hiding the first of the rendered predetermined number of views for the web-based data driven form.

5. The method of claim 4, wherein hiding the first of the rendered predetermined number of views for the web-based data driven form comprises displaying the first of the rendered predetermined number of views for the web-based data driven form sliding out of a viewable space of a display device of the user device.

6. The method of claim 4, further comprising deleting the first of the rendered predetermined number of views for the web-based data driven form, the deleting comprising removing the data corresponding to the first of the rendered predetermined number of views from the cache.

7. The method of claim 1, further comprising:
   determining if the cache stores additional data for rendering another web-based data driven form; and
   in response to determining that the cache does not store the additional data, filling the cache with obtained data.

8. The method of claim 7, further comprising:
   rendering an additional web-based data driven form using the obtained data; and
   hiding the additional web-based data driven form.

9. A computer storage medium having computer readable instructions stored thereupon that, when executed by a computer, cause the computer to perform operations to provide a web-based data driven form without use of a native application on a user device, the operations comprising:
   accessing, from a web server at the user device, a web page resource that is associated with data used in rendering the web-based data driven form at the user device that corresponds to the web page resource;
   asynchronously caching, in a cache at the user device, data for rendering a predetermined number of views for the web-based data driven form, the asynchronously caching being relative to the rendering of the predetermined number of views and resulting in a reduction of perceived latency in display of the web-based data driven form, a number of the predetermined number of views being based on an anticipated viewing speed or an anticipated rendering speed;

rendering, at the user device in a manner not visible to a user, the predetermined number of views for the web-based data driven form using the cached data, each of the rendered predetermined number of views comprising a view of the web-based data driven form that includes at least a portion of the cached data;

displaying, at a display device of the user device, a first of the rendered predetermined number of views for the web-based data driven form and hide other views of the rendered predetermined number of views for the web-based data driven form;

detecting, at the user device, input corresponding to a command for displaying a second view of the rendered predetermined number of views for the web-based data driven form; and in response to the detecting, displaying the second of the rendered predetermined number of views.

10. The computer storage medium of claim 9, wherein determining whether input is detected comprises monitoring a touchscreen in communication with the user device for contact, and wherein the input comprises a touch gesture detected at the touchscreen.

11. The computer storage medium of claim 9, wherein the displaying the second of the rendered predetermined number of views for the web-based data driven form comprises hiding the first of the rendered predetermined number of views for the web-based data driven form.

12. The computer storage medium of claim 11, wherein hiding the first of the rendered predetermined number of views for the web-based data driven form comprises displaying the first of the rendered predetermined number of views for the web-based data driven form sliding out of a viewable space of a display device of the user device.

13. The computer storage medium of claim 11, wherein hiding the first of the rendered predetermined number of views for the web-based data driven form and displaying the second of the rendered predetermined number of views for the web-based data driven form are completed using data stored in the cache.

14. The computer storage medium of claim 11, wherein the operations further comprise:
determining whether the cache stores additional data for rendering another web-based data driven form;
filling the cache with obtained data, in response to determining that the cache does not store the additional data;
rendering an additional web-based data driven form using the obtained data; and
hiding the additional web-based data driven form.

15. A system comprising:
a computer;
a display device; and
a computer storage medium having computer readable instructions stored thereupon that, when executed by a computer, cause the computer to perform operations to provide a web-based data driven form without use of a native application on a user device, the operations comprising:
accessing from a web server at the computer, a web page resource that is associated with data used in rendering the web-based data driven form at the display device;
asynchronously caching, in a cache at the computer, data for rendering a predetermined number of views for the web-based data driven form, the asynchronously caching being relative to the rendering of the predetermined number of views and resulting in a reduction of perceived latency in display of the web-based data driven form, a number of the predetermined number of views being based on an anticipated viewing speed or an anticipated rendering speed;
rendering, at the computer in a manner not visible to a user, the predetermined number of views for the web-based data driven form using the cached data, each of the rendered predetermined number of views comprising a view of the web-based data driven form that includes at least a portion of the cached data;
displaying, at the display device, a first of the rendered predetermined number of views and hiding other views of the rendered predetermined number of views;
detecting, at the computer, input corresponding to a command for displaying a second of the rendered predetermined number of views; and
in response to the detecting, displaying the second of the rendered predetermined number of the views.

16. The system of claim 15, wherein determining whether input is detected comprises monitoring a touchscreen in communication with the computer for contact,
wherein the input comprises a touch gesture detected at the touchscreen, and
wherein displaying the second of the rendered predetermined number of views for the web-based data driven form comprises hiding the first of the rendered predetermined number of views for the web-based data driven form, and displaying the second of the rendered predetermined number of views for the web-based data driven form.

17. The system of claim 15, wherein hiding the first of the rendered predetermined number of views for the web-based data driven form comprises displaying the first of the rendered predetermined number of views for the web-based data driven form sliding out of a viewable space of the display device, and
wherein displaying the second of the rendered predetermined number of views for the web-based data driven form comprises displaying the second of the rendered predetermined number of views for the web-based data driven form into the viewable space.

18. The system of claim 15, wherein the operations further comprise:
determining whether the cache stores additional data for rendering another data driven form;
filling the cache with obtained data, in response to determining that the cache does not store the additional data;
rendering an additional data driven form using the obtained data; and
hiding the additional data driven form.

* * * * *